United States Patent
Hendrickson (10) Patent No.: US 10,465,828 B2
(45) Date of Patent: Nov. 5, 2019

(54) TUBE FITTING

(71) Applicant: United Technologies Corporation, Farmington, CT (US)

(72) Inventor: Timothy R Hendrickson, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 208 days.

(21) Appl. No.: 15/425,303

(22) Filed: Feb. 6, 2017

(65) Prior Publication Data

US 2018/0224042 A1  Aug. 9, 2018

(51) Int. Cl.
*F16L 39/00* (2006.01)
*F16L 5/14* (2006.01)

(52) U.S. Cl.
CPC .............. *F16L 39/005* (2013.01); *F16L 5/14* (2013.01)

(58) Field of Classification Search
CPC ......... F16L 39/005; F16L 11/20; F16L 39/00; F16L 51/005; F16L 39/02; F16L 39/04; F16L 33/01; F16L 5/14
USPC .... 285/123.1, 123.3, 123.15, 123.16, 13, 14
See application file for complete search history.

(56) References Cited

U.S. PATENT DOCUMENTS

| | | | |
|---|---|---|---|
| 3,248,880 A | 5/1966 | Hull, Jr. | |
| 3,272,537 A * | 9/1966 | Bellatorre | F16L 39/005 285/123.16 X |
| 3,312,448 A | 4/1967 | Hull, Jr. | |
| 4,156,342 A | 5/1979 | Danko et al. | |
| 4,947,639 A | 8/1990 | Hibner | |
| 4,967,460 A | 11/1990 | Runyan | |
| 4,972,671 A | 11/1990 | Asselin | |
| 4,983,051 A | 1/1991 | Hibner | |
| 5,110,257 A | 5/1992 | Hibner | |
| 5,203,384 A * | 4/1993 | Hansen | 285/123.1 X |
| 5,628,532 A | 5/1997 | Ashcraft | |
| 5,839,268 A | 11/1998 | Morris | |
| 6,086,114 A * | 7/2000 | Ziu | F16L 39/005 285/123.16 |
| 6,412,820 B1 | 7/2002 | Erps | |
| 6,438,938 B1 | 8/2002 | Burkholder | |
| 7,500,788 B2 | 3/2009 | Joyner | |
| 8,230,974 B2 | 7/2012 | Parnin | |
| 9,494,048 B1 | 11/2016 | Parnin | |

(Continued)

FOREIGN PATENT DOCUMENTS

CN 101011860 8/2007
EP 2258929 12/2010

(Continued)

OTHER PUBLICATIONS

European Patent Office, European Search Report dated Jun. 12, 2018 in Application No. 18155139.1-1006.

(Continued)

*Primary Examiner* — Zachary T Dragicevich
(74) *Attorney, Agent, or Firm* — Snell & Wilmer, L.L.P.

(57) ABSTRACT

A fitting for a double wall tube may comprise an inner portion defining an inner fluid passage. An outer portion may be disposed concentrically around the inner portion and may define an outer fluid passage between the outer portion and the inner portion. The outer portion may define a first aperture disposed through a sidewall of the outer portion.

16 Claims, 6 Drawing Sheets

(56) References Cited

U.S. PATENT DOCUMENTS

| | | | |
|---|---|---|---|
| 2003/0230274 A1 | 12/2003 | Williams | |
| 2010/0207379 A1 | 8/2010 | Olver | |
| 2010/0275572 A1 | 11/2010 | Durocher | |
| 2010/0276026 A1* | 11/2010 | Powell | F16L 39/005 |
| 2011/0085895 A1 | 4/2011 | Durocher | |
| 2011/0284103 A1 | 11/2011 | Davis | |
| 2013/0022446 A1 | 1/2013 | Chevillot et al. | |
| 2013/0189071 A1 | 7/2013 | Durocher | |
| 2013/0280043 A1 | 10/2013 | Parnin | |
| 2013/0318940 A1 | 12/2013 | Parnin | |
| 2014/0116561 A1 | 5/2014 | Krall | |
| 2015/0130183 A1* | 5/2015 | Statler, III | F16L 39/005 285/123.15 |
| 2015/0219011 A1 | 8/2015 | Muldoon | |
| 2015/0354382 A1 | 12/2015 | Pakkala | |
| 2016/0215652 A1 | 7/2016 | Mastro | |
| 2016/0305284 A1 | 10/2016 | Mastro | |
| 2016/0312699 A1 | 10/2016 | Teicholz | |
| 2017/0114662 A1 | 4/2017 | Mastro | |
| 2017/0234158 A1 | 8/2017 | Savela | |
| 2018/0073395 A1 | 3/2018 | Parnin | |
| 2018/0128122 A1 | 5/2018 | Avis | |
| 2018/0128124 A1 | 5/2018 | Avis | |
| 2018/0230854 A1 | 8/2018 | Parnin | |
| 2018/0283211 A1 | 10/2018 | Parnin | |
| 2018/0306062 A1 | 10/2018 | Avis | |

FOREIGN PATENT DOCUMENTS

| | | |
|---|---|---|
| EP | 2662537 | 11/2013 |
| EP | 2944774 | 11/2015 |
| EP | 3081760 | 10/2016 |
| EP | 3318729 | 5/2018 |
| FR | 2341094 | 9/1977 |
| FR | 3014478 | 6/2015 |
| GB | 623615 | 5/1949 |
| GB | 2218751 | 11/1989 |
| WO | 2014051658 | 4/2014 |
| WO | 2014152123 | 9/2014 |
| WO | 2015102779 | 7/2015 |

OTHER PUBLICATIONS

European Patent Office, European Search Report dated Jun. 22, 2018 in Application No. 18155177.1-1010.
European Patent Office, European Search Report dated Jun. 27, 2018 in Application No. 18155144.1-1007.
European Patent Office, European Search Report dated Jul. 4, 2018 in Application No. 18154684.7-1006.
European Patent Office, European Search Report dated Mar. 23, 2018 in Application No. 17199700.0-1006.
European Patent Office, European Search Report dated Mar. 23, 2018 in Application No. 17199693.7-1006.
U.S. Appl. No. 15/344,132, filed Nov. 4, 2016 and entitled Apparatus and Method for Providing Fluid to a Bearing Damper.
U.S. Appl. No. 15/344,157, filed Nov. 4, 2016 and entitled Apparatus and Method for Providing Fluid to a Bearing Damper.
U.S. Appl. No. 15/344,185, filed Nov. 4, 2016 and entitled Apparatus and Method for Providing Fluid to a Bearing Damper.
U.S. Appl. No. 15/344,195, filed Nov. 4, 2016 and entitled Apparatus and Method for Providing Fluid to a Bearing Damper.
U.S. Appl. No. 15/425,337, filed Feb. 6, 2017 and entitled Multiwall Tube and Fitting for Bearing Oil Supply.
U.S. Appl. No. 15/425,372, filed Feb. 6, 2017 and entitled Threaded Fitting for Tube.
U.S. Appl. No. 15/425,410, filed Feb. 6, 2017 and entitled Fitting for Multiwall Tube.
USPTO, Restriction / Election Requirement dated Jan. 2, 2019 in U.S. Appl. No. 15/344,195.
USPTO, Restriction / Election Requirement dated Jan. 3, 2019 in U.S. Appl. No. 15/425,337.
USPTO, Non-Final Office Action dated Jan. 3, 2019 in U.S. Appl. No. 15/344,157.
USPTO, Non-Final Office Action dated Jan. 23, 2019 in U.S. Appl. No. 15/425,372.
USPTO, Non-Final Office Action dated Jan. 24, 2019 in U.S. Appl. No. 15/344,132.
USPTO, Non-Final Office Action dated Mar. 8, 2019 in U.S. Appl. No. 15/344,195.
USPTO, Non-Final Office Action dated Apr. 29, 2019 in U.S. Appl. No. 15/425,337.
USPTO, Non-Final Office Action dated May 16, 2019 in U.S. Appl. No. 15/344,185.
USPTO, Final Office Action dated May 30, 2019 in U.S. Appl. No. 15/344,157.
USPTO, Notice of Allowance dated Jun. 5, 2019 in U.S. Appl. No. 15/425,372.
USPTO, Notice of Allowance dated Jun. 7, 2019 in U.S. Appl. No. 15/425,337.
USPTO, Final Office Action dated Jun. 10, 2019 in U.S. Appl. No. 15/344,132.
USPTO, Corrected Notice of Allowance dated Jul. 2, 2019 in U.S. Appl. No. 15/425,337.
USPTO, Restriction/Election Requirement dated Jul. 8, 2019 in U.S. Appl. No. 15/425,410.

* cited by examiner

TUBE FITTING

FIELD

The present disclosure relates to tube assemblies and, more specifically, to fittings for double wall tubes.

BACKGROUND

Various industries such as automotive, marine, aircraft, medical, plumbing and electrical industries may use various double wall tubes for delivery and transport of fluids. Tubing and conduits of various types can be used to route fluids throughout an engine, for example. A double wall tube may have an outer passage formed between an inner tube and an outer tube. The inner tube and the outer tube may each carry a fluid, and may carry different fluids, fluids having different characteristics or fluids flowing in different directions. It may be difficult to maintain separation of the fluids at the exit of a double wall tube.

SUMMARY

A fitting for a valve assembly is described herein, in accordance with various embodiments. A fitting for a double wall tube may comprise an inner portion defining an inner fluid passage. An outer portion may be disposed concentrically around the inner portion and may define an outer fluid passage between the outer portion and the inner portion. The outer portion may define a first aperture disposed through a sidewall of the outer portion.

In various embodiments, the outer portion may further comprise a first axial end and a second axial end with a diameter of the first axial end being greater than a diameter of the second axial end. The second axial end of the outer portion may be coupled to an outer surface of the inner portion. The second axial end of the outer portion may be integral with the outer surface of the inner portion. The first axial end of the outer portion may be offset from the outer surface of the inner portion to form an inlet of the outer fluid passage. The first aperture may form an outlet of the outer fluid passage. The outer portion may further define a second aperture disposed through the sidewall of the outer portion. A prong of the sidewall may be disposed between the first aperture and the second aperture. The prong of the sidewall may be coupled to the first axial end and the second axial end of the outer portion. The outer portion may comprise a frustoconical portion, and the inner portion may comprise a tubular portion. The outer fluid passage may be fluidly isolated from the inner fluid passage. The outer fluid passage may be concentric with the inner fluid passage.

A double wall tubing assembly is also provided. The double wall tubing assembly may comprise an outer tube. An inner tube may be disposed within the outer tube. A fitting may be coupled to the inner tube and the outer tube. The fitting for a double wall tube may comprise an inner portion defining an inner fluid passage. An outer portion may be disposed concentrically around the inner portion and may define an outer fluid passage between the outer portion and the inner portion. The outer portion may define a first aperture disposed through a sidewall of the outer portion.

In various embodiments, the outer portion may further comprise a first axial end and a second axial end with a diameter of the first axial end being greater than a diameter of the second axial end. The second axial end of the outer portion may be coupled to an outer surface of the inner portion. The second axial end of the outer portion may be integral with the outer surface of the inner portion. The first axial end of the outer portion may be offset from the outer surface of the inner portion to form an inlet of the outer fluid passage. The first aperture may form an outlet of the outer fluid passage. The outer portion may further define a second aperture disposed through the sidewall of the outer portion. A prong of the sidewall may be disposed between the first aperture and the second aperture. The prong of the sidewall may be coupled to the first axial end and the second axial end of the outer portion. The outer portion may comprise a frustoconical portion, and the inner portion may comprise a tubular portion. The outer fluid passage may be fluidly isolated from the inner fluid passage. The outer fluid passage may be concentric with the inner fluid passage.

A double wall tubing assembly may comprise an inner tube defining a first fluid path. An outer tube may be disposed around the inner tube and may define a second fluid path between the outer tube and the inner tube. A fitting may be coupled to the inner tube and the outer tube. The fitting may comprise a first inlet in fluid communication with the first fluid path. A second inlet may be in fluid communication with the second fluid path. The fitting may be configured to fluidly isolate the second fluid path from the first fluid path.

In various embodiments, the second fluid path may be concentric with the first fluid path, and wherein the second inlet is concentric with the first inlet. The fitting may define a plurality of apertures disposed through a sidewall of the fitting. The apertures may form an outlet for the second fluid path. The fitting may further comprise an inner portion and an outer portion disposed around the inner portion. The first inlet may be defined within the inner portion and the second inlet may be defined between a first axial end of the outer portion and an outer surface of the inner portion. The double wall tubing assembly may further comprise a seal disposed at an outlet of the fitting and disposed between the first fluid path and the second fluid path.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to fittings for double wall tubes and multi-wall tubes. A double wall tube may define two or more concentric fluid paths. For example, an inner tube may define a first fluid path. A second fluid path may be defined between the inner tube and an outer tube. It may be desirable to fluidly isolate the first fluid path from the second fluid path. A fitting may join a distal end of an inner tube with a distal end of an outer tube, while maintaining separation of the fluid paths.

Figure 1A:
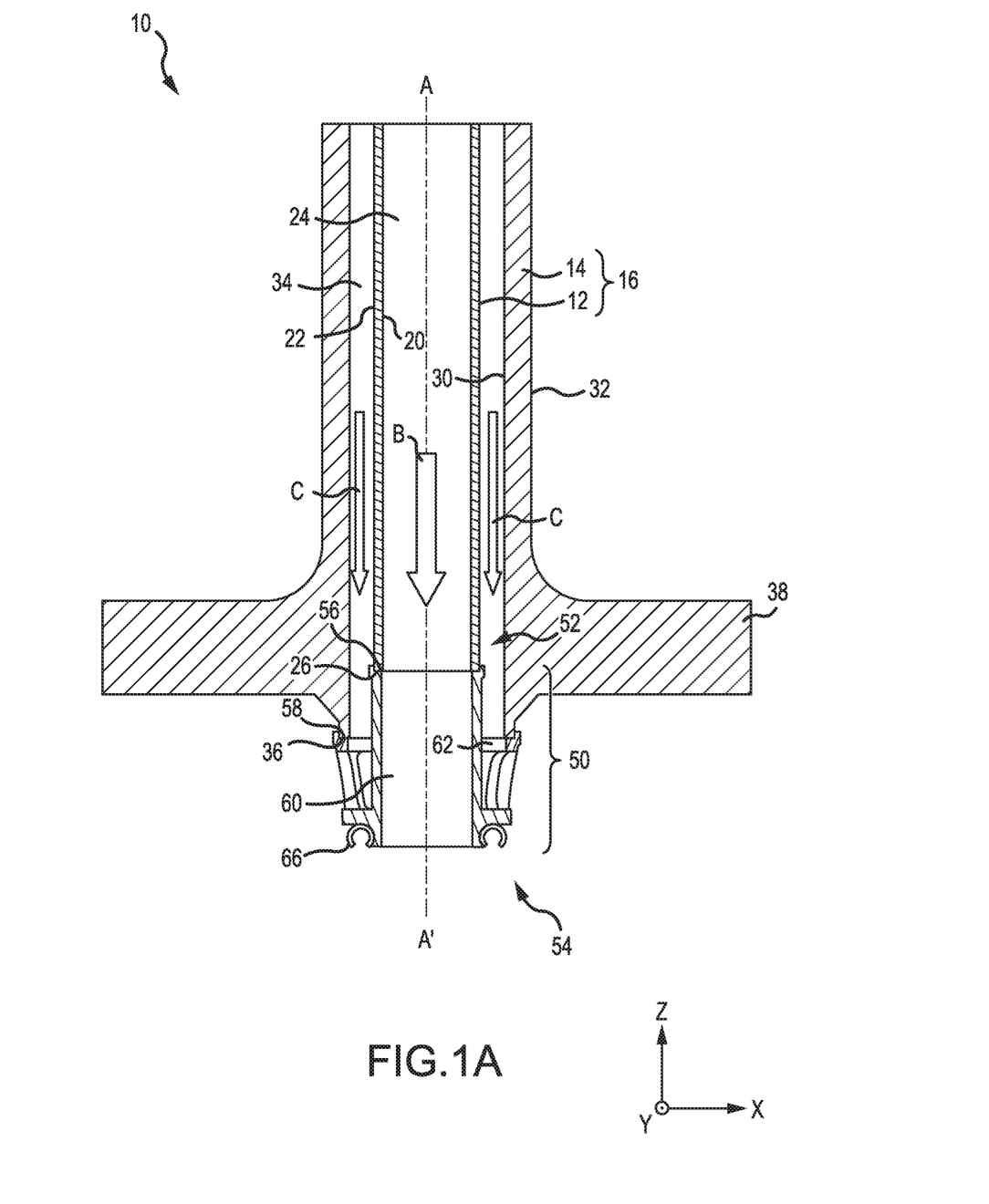
FIG. 1A illustrates a cross-sectional view of a double wall tubing assembly, in accordance with various embodiments.
Figure 1B:
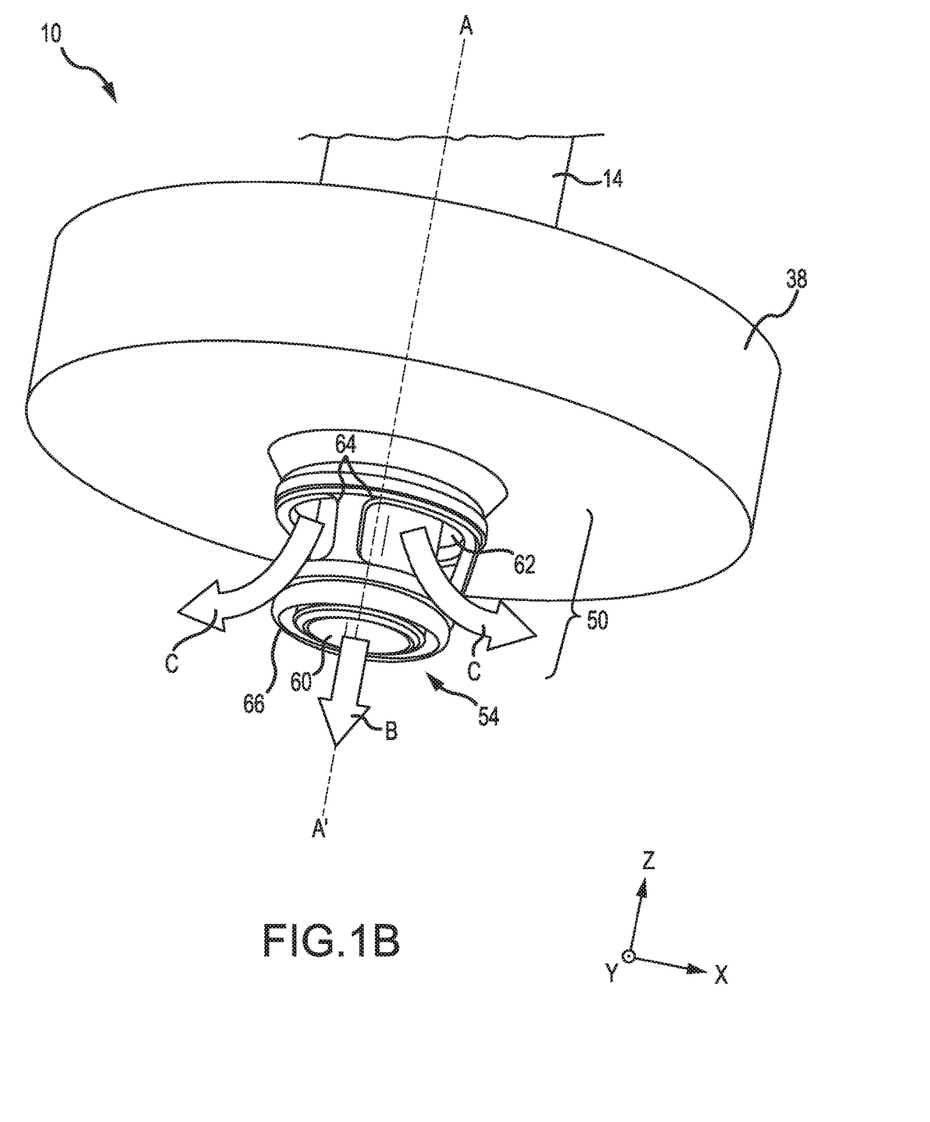
FIG. 1B illustrates a perspective view of a double wall tubing assembly, in accordance with various embodiments.

Referring to FIGS. 1A and 1B, a double wall tubing assembly 10 is shown, in accordance with various embodiments. Double wall tubing assembly 10 may include an inner tube 12 disposed within an outer tube 14. Outer tube 14 may be disposed around inner tube 12 in a concentric and/or coaxial arrangement. Inner tube 12 and outer tube 14 together may form a double wall tube 16. Inner tube 12 and outer tube 14 may be concentric about a longitudinal axis A-A', which is collinear with the longitudinal axes of inner tube 12 and outer tube 14 and which is parallel to the z-direction on the provided xyz axes. Inner tube 12 may include an inner surface 20 and an outer surface 22. Inner tube 12 may include an inner fluid passage 24 defined by inner surface 20. Outer tube 14 may include an inner surface 30 and an outer surface 32. An outer fluid passage 34 may be defined between outer tube 14 and inner tube 12. Outer fluid passage 34 may have a generally annular cross section. Each of inner fluid passage 24 and outer fluid passage 34 may contain a fluid, such as lubricant, oil, fuel, air or other fluid. Inner fluid passage 24 and outer fluid passage 34 may contain similar or different fluids, which may have similar or different temperatures and/or pressures.

An inner surface 20 of inner tube 12 may define a first fluid path B through inner fluid passage 24. Outer surface 22 of inner tube 12 and an inner surface 30 of outer tube 14 may define a second fluid path C through outer fluid passage 34. First fluid path B and second fluid path C are each illustrated as flowing in the negative z-direction on the provided xyz axes. It is further contemplated and understood that first fluid path B and/or second fluid path C may flow in various directions, including the positive z-direction, in accordance with various embodiments. As used herein, "distal" refers to the direction toward the negative z-direction on the provided xyz axes relative to the double wall tubing assembly 10. As used herein, "proximal" refers to a direction toward the positive z-direction on the provided xyz axes relative to the double wall tubing assembly 10.

Double wall tubing assembly 10 may further comprise a fitting 50 configured to couple both to a distal end 26 of inner tube 12 and to a distal end 36 of outer tube 14. Outer tube 14 may further include a flange 38 extending radially outward from outer surface 32 of outer tube 14. Flange 38 may be coupled to or integral with outer tube 14. As used herein, the term "integrated" or "integral" may include being formed as one, single continuous piece. Outer tube 14 may extend distally in an axial direction (negative z-direction) beyond flange 38 and beyond distal end 26 of inner tube 12. In various embodiments, a distal end 26 of inner tube 12 may be recessed relative to a distal end 36 of outer tube 14, such that outer tube 14 protrudes distally relative to inner tube 12.

Fitting 50 may be configured to couple to both inner tube 12 and outer tube 14 of double wall tubing assembly 10. Fitting 50 may comprise a proximal end 52 and a distal end 54 opposite to the proximal end 52. Proximal end 52 of fitting 50 may further include an inner proximal end 56 and an outer proximal end 58. Inner proximal end 56 of fitting 50 may be configured to couple to distal end 26 of inner tube 12, and may form a seal between inner proximal end 56 of fitting 50 and inner tube 12. Inner proximal end 56 of fitting 50 may be mechanically fastened, welded, brazed, adhered and/or otherwise attached to inner proximal end 56 of fitting 50. Fitting 50 may define an inner fluid passage 60, which forms a continuous fluid path with inner fluid passage 24 of inner tube 12. Distal end 54 of fitting 50 may be configured to couple to additional tubing configured to receive fluid from first fluid path B.

Outer proximal end 58 of fitting 50 may be configured to couple to distal end 36 of outer tube 14, and may form a seal between fitting 50 and outer tube 14. Outer proximal end 58 of fitting 50 may be mechanically fastened, welded, brazed, adhered and/or otherwise attached to distal end 36 of outer tube 14. Fitting 50 may define an outer fluid passage 62, which forms a continuous fluid path with outer fluid passage 34 of outer tube 14. Fitting 50 may further be configured to maintain a position of inner tube 12 with respect to outer tube 14, for example, to hold inner tube 12 in a fixed position relative to outer tube 14. Thus, fitting 50 may provide structural support for the inner tube 12 and/or outer tube 14.

Referring to FIG. 1B, a double wall tubing assembly 10 is shown, in accordance with various embodiments. As discussed above, fitting 50 may be configured to couple to inner tube 12 and outer tube 14 to receive fluid from each fluid passage of the inner tube 12 and outer tube 14. Fitting 50 may maintain first fluid path B separate and fluidly isolated from second fluid path C. As discussed, distal end 54 of fitting 50 may be configured to couple to additional tubing configured to receive fluid from inner fluid passage 60. In various embodiments, a seal 66 may be disposed around a distal outer surface of fitting 50. Seal 66 may be configured to provide a seal between fitting 50 and additional components coupled to distal end 54 of fitting 50 in order to maintain fluid isolation of inner fluid passage 60 relative to outer fluid passage 62. Seal 66 may be disposed at an outlet of fitting 50 and may be disposed between the first fluid path B and the second fluid path C. Seal 66 may include, for example, a C-seal, brush seal, carbon seal, O-ring seal or other seal type. In this regard, a C-seal may have a cross-sectional shape that is partially circular. Seal 66 may provide sealing around a circumference of distal end 54 of fitting 50.

Fitting 50 may define an outer fluid passage 62 through which second fluid path C flows and exits fitting 50 through one or more apertures 64 in fitting 50. Fitting 50 may further couple to additional tubing or components configured to receive fluid from outer fluid passage 62. Thus, fitting 50 operates as a coupling for a double wall tube 16, i.e. inner tube 12 and outer tube 14 together, and maintains two separate flow paths, such as first fluid path B and second fluid path C.

Figure 2A:
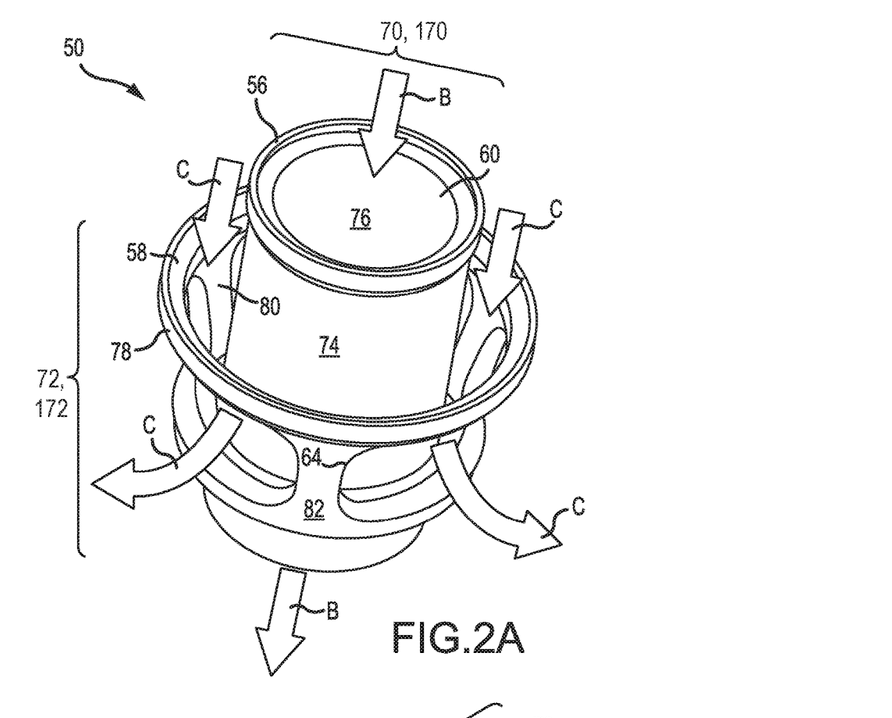
FIGS. 2A and 2B illustrate perspective views of a fitting for a double wall tube, in accordance with various embodiments.
Figure 2B:
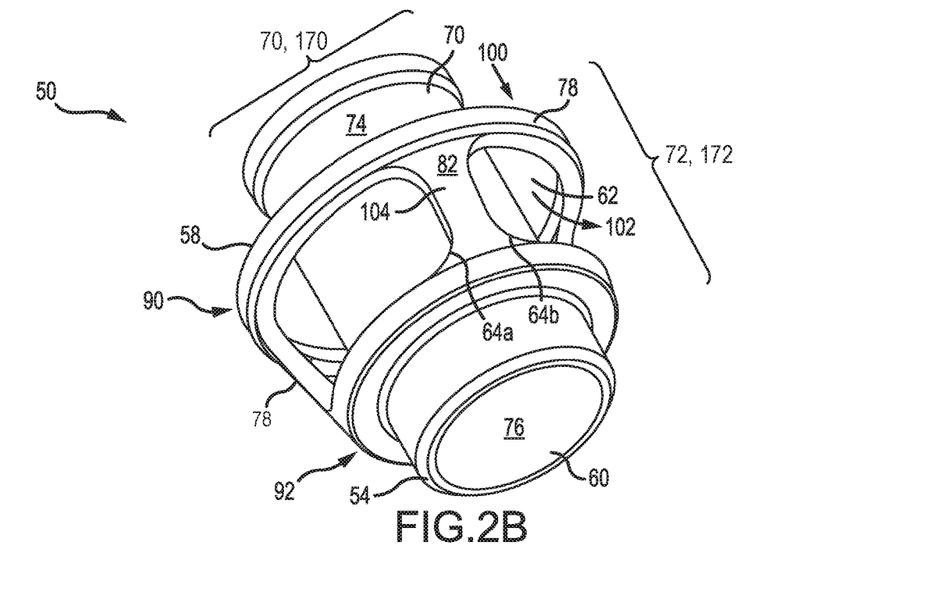

Referring to FIGS. 2A and 2B, a fitting 50 for a double wall tubing assembly is shown, in accordance with various embodiments. In various embodiments, the fitting 50 is a monolithic fitting. In various embodiments, fitting 50 may include an inner portion 70 and an outer portion 72. Inner portion 70 may comprise a tubular portion 170, and outer portion 72 may comprise a frustoconical portion 172. The outer portion 72 may be disposed around an outer surface 74 of the inner portion 70 and may be concentrically oriented relative to the inner portion 70. Inner portion 70 may include an inner surface 76 and an outer surface 74. Inner fluid passage 60 may be defined by an inner surface 76 of inner portion 70. Outer portion 72 may include an inner surface 80 and an outer surface 82. Outer fluid passage 62 may be defined between the outer portion 72 and the inner portion 70, and more specifically, outer fluid passage 62 may be defined by outer surface 74 of inner portion 70 and inner surface 80 of outer portion 72. Outer fluid passage 62 may be concentric with inner fluid passage 60 and may be fluidly isolated from inner fluid passage 60.

Outer portion 72 further includes a first axial end 90 and a second axial end 92. The second axial end 92 of outer portion 72 may be coupled to outer surface 74 of inner portion 70. Second axial end 92 may be integral with outer surface 74 such that outer portion 72 and inner portion 70 are integrally formed. The first axial end 90 of outer portion 72 may be radially offset from inner portion 70 so as to form an inlet 100 of outer fluid passage 62. Inlet 100 may be an annular inlet.

In various embodiments, outer portion 72 may define one or more apertures 64 formed through a sidewall 78 of outer portion 72. One or more apertures 64 disposed through a sidewall 78 of outer portion 72 extend from inner surface 80 to outer surface 82 of outer portion 72. The apertures 64 may form an outlet 102 of outer fluid passage 62 allowing second fluid path C to exit fitting 50 without mixing with first fluid path B. Apertures 64 may have a trapezoidal shape, a partial annular shape, a circular shape, an oval shape or any suitable shape. FIG. 2B shows fitting 50 with outer portion 72 as frustoconical portion 172 having a first aperture 64a and a second aperture 64b separated by a prong 104 of sidewall 78. Prong 104 of sidewall 78 may be disposed between first aperture 64a and second aperture 64b and may be coupled to the first axial end 90 and the second axial end 92 of outer portion 72.

Referring again to FIG. 1A and still to FIGS. 2A and 2B, fitting 50 may be used to couple to a double wall tube 16 (FIG. 1A) and to a bearing system of a gas turbine engine for delivering oil to the bearing system of the gas turbine engine, in accordance with various embodiments. In various embodiments, fitting 50 may contain a first fluid in first fluid path B and a second fluid in second fluid path C. The first fluid may have similar or different characteristics from the second fluid. For example, the first fluid of first fluid path B may have a higher pressure than the second fluid of second fluid path C. The first fluid of first fluid path B may also have a higher temperature than the second fluid of second fluid path C. Fitting 50 may be any suitable material for the thermal environment encountered by the fitting 50, including for example a metallic and/or non-metallic material.

In various embodiments, fitting 50 may also be configured to minimize thermal load transfer between inner tube 12 and outer tube 14. Prongs 104 of outer portion 72 may be configured to reduce conductive heat transfer between inner tube 12 and outer tube 14. For example, a width of prongs 104 may be less than a width of apertures 64 in order to minimize the material that couples outer tube 14 to inner portion 70. By forming prongs 104 with a relatively thin shape, the heat transfer between first axial end 90 and second axial end 92 of outer portion 72, and thus the heat transfer between inner tube 12 and outer tube 14, may be reduced.

Figure 3:
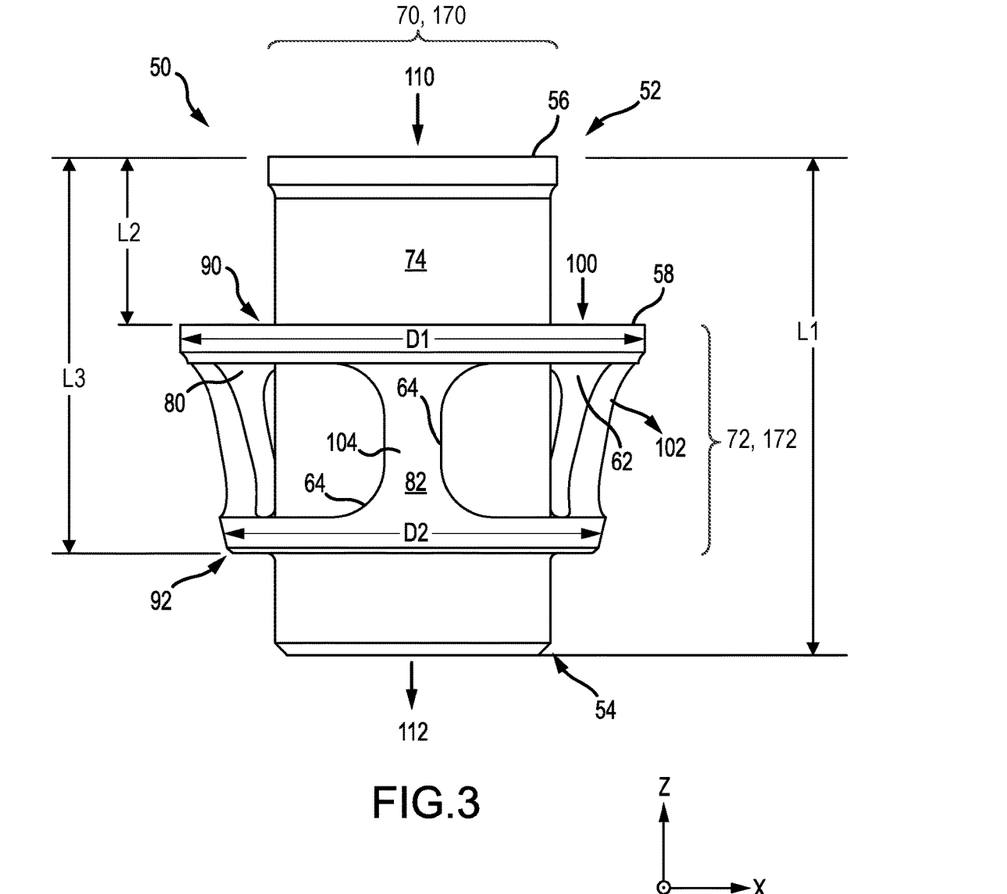
FIG. 3 illustrates a side view of a fitting for a double wall tube, in accordance with various embodiments.

Referring to FIG. 3, a side view of fitting 50 is shown, in accordance with various embodiments. As discussed, fitting 50 may include an outer portion 72 formed concentrically around outer surface 74 of inner portion 70. Inner portion 70 and outer portion 72 may be integrally formed. An inner portion axial distance L1 may be defined as an axial distance from proximal end 52 to distal end 54. A diameter D1 of the first axial end 90 of outer portion 72 may be greater than a diameter D2 of the second axial end 92 of outer portion 72. The inner portion axial distance L1 may be greater than a first axial distance L2 from the proximal end 52 to the first axial end 90 of outer portion 72. The inner portion axial distance L1 may be greater than a second axial distance L3 from the proximal end 52 to the second axial end 92 of the outer portion 72. The first axial end 90 of outer portion 72 may be radially offset from outer surface 74 of inner portion 70. The second axial end 92 of outer portion 72 may be coupled to or formed integrally with the outer surface 74 of inner portion 70. A difference between the diameter D1 of the first axial end 90 and the diameter D2 of the second axial end 92 may determine the sidewall angle of outer portion 72. The sidewall angle of outer portion 72 and size of apertures 64 may be configured to minimize pressure loss in the fluid within outer fluid passage 62.

With continued reference to FIG. 3 and with reference to FIG. 1A, outer fluid passage 62 of fitting 50 may comprise inlet 100 and outlet 102. Inlet 100 may be in fluid communication with the second fluid path C. The inlet 100 of outer fluid passage 62 formed between inner portion 70 and first axial end 90 of outer portion 72 may be similar in size and shape to outer fluid passage 34 of double wall tube 16. Fitting 50 may define a plurality of apertures 64 disposed through a sidewall 78 of the fitting 50. Apertures 64 may form outlet 102 for the second fluid path C to exit fitting 50. The shape and size of apertures 64 may be configured to provide a large cross sectional surface area at outlet 102 of outer fluid passage 62. The shape of outer portion 72 and apertures 64 may allow fluid to flow from outer fluid passage 34 of double wall tube 16 and through outer fluid passage 62 of fitting 50 with minimal fluid pressure loss. As fluid flows from inlet 100 and in the negative z-direction through outer fluid passage 62, the frustoconical shape allows fluid to exit through apertures 64 with reduced impingement of the fluid on inner surface 80 of outer portion 72. By minimizing impingement of fluid flow on outer portion 72, pressure loss is reduced.

Inner portion 70 may comprise an inlet 110 and an outlet 112. Inlet 110 may be in fluid communication with the first fluid path B. Inlet 110 may have a similar cross-sectional size and shape as inner fluid passage 24 of double wall tube 16. Second fluid path C may be concentric with the first fluid path B, and inlet 100 may be concentric with inlet 110. Outlet 112 at distal end 54 of fitting 50 may be configured according to the component to be coupled to distal end 54 of fitting 50.

Figure 4:
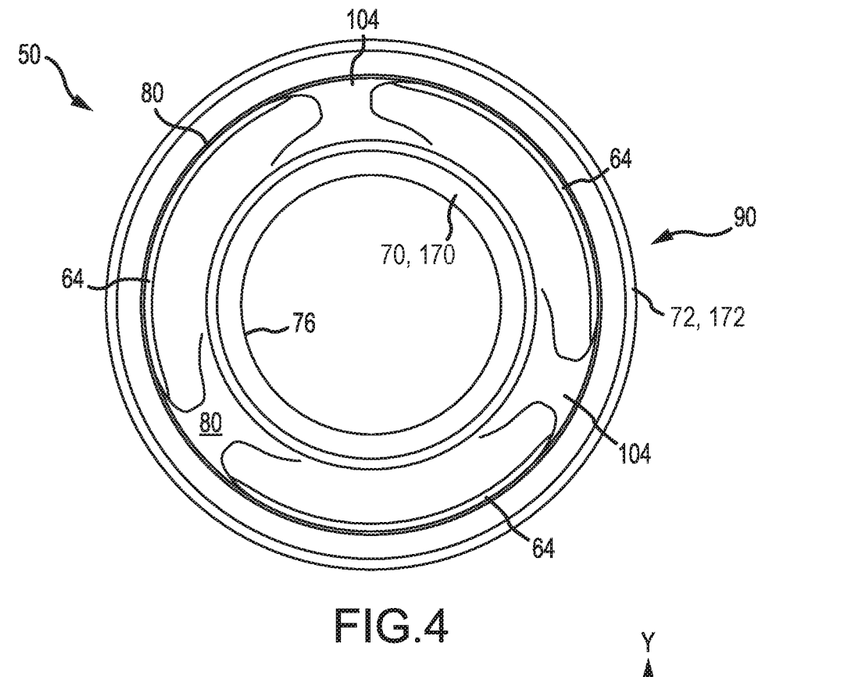
FIG. 4 illustrates a top view of a fitting for a double wall tube, in accordance with various embodiments.

Referring to FIG. 4, a top view of fitting 50 is shown, in accordance with various embodiments. As discussed above, the shape of outer portion 72 as frustoconical portion 172 may reduce impingement of fluid on inner surface 80 of outer portion 72. Apertures 64 are separated by prongs 104, which are shown having a relatively smaller surface area than an area of apertures 64. By minimizing the surface area of inner surface 80, fluid pressure loss due to fluid impingement on inner surface 80 may be reduced and conductive heat transfer between first axial end 90 of outer portion 72 and inner portion 70 may be reduced.

Figure 5A:
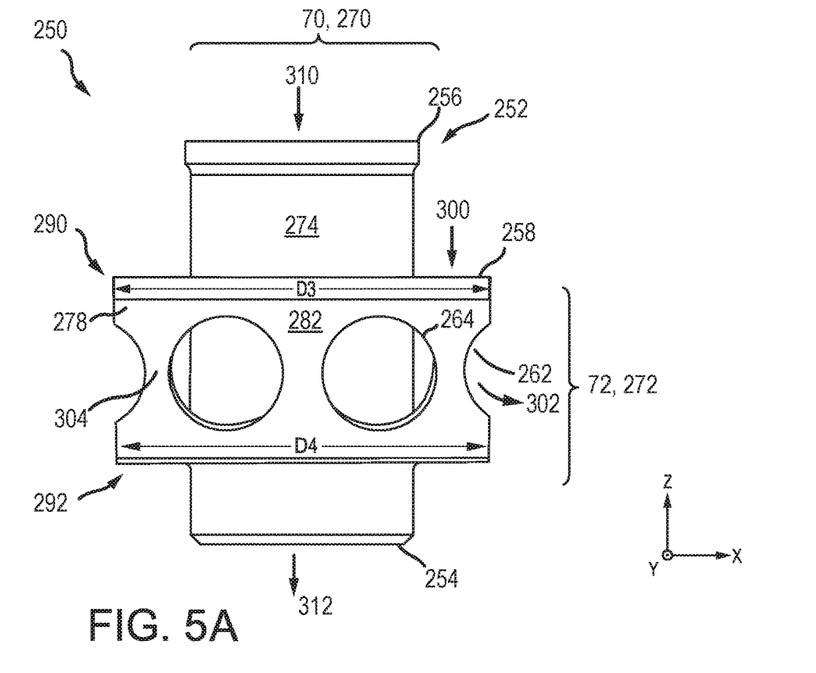
FIGS. 5A and 5B illustrate a side view and a perspective view of a fitting for a double wall tube, in accordance with various embodiments.
Figure 5B:
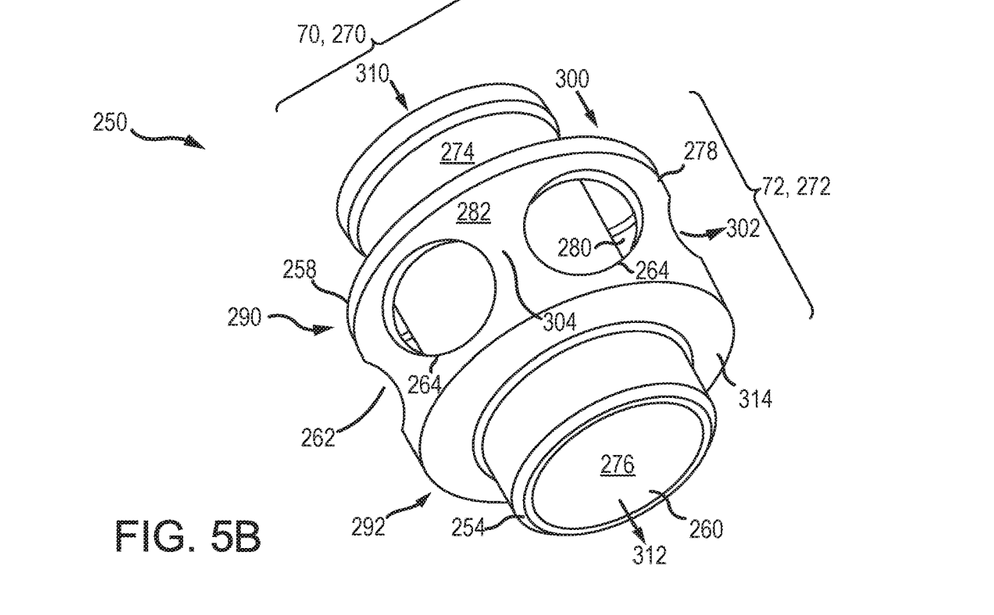

Referring to FIGS. 5A and 5B, a fitting 250 for a double wall tube is shown, in accordance with various embodiments. Fitting 250 may comprise a proximal end 252 and a distal end 254. Proximal end 252 of fitting 250 may further include an inner proximal end 256 and an outer proximal end 258. Similar to fitting 50 (FIG. 2A), fitting 250 may be used to couple to a double wall tube 16 (FIG. 1A). In various embodiments, fitting 250 may include an inner portion 70 and an outer portion 72. Inner portion 70 may comprise a first tubular portion 270, and outer portion 72 may comprise a second tubular portion 272. The outer portion 72 may be disposed around an outer surface 274 of the inner portion 70 and may be concentrically oriented relative to the inner portion 70. Fitting 250 may define an inner fluid passage 260 and an outer fluid passage 262. Inner fluid passage 260 may be defined by an inner surface 276 of inner portion 70. Inner portion 70 may comprise an inlet 310 and an outlet 312 for inner fluid passage 260. Distal end 254 of fitting 250 may be configured to couple to additional tubing configured to receive fluid from inner fluid passage 260.

Outer portion 72 may include an inner surface 280 and an outer surface 282. Outer fluid passage 262 may be defined between the outer portion 72 and the inner portion 70, and more specifically, outer fluid passage 262 may be defined by outer surface 274 of inner portion 70 and inner surface 280 of outer portion 72. Outer fluid passage 262 may be concentric with inner fluid passage 260 and may be fluidly isolated from inner fluid passage 260. Outer portion 72 further includes a first axial end 290 and a second axial end 292. Second axial end 292 of outer portion 72 may be coupled to outer surface 274 of inner portion 70. Second axial end 292 may be integral with outer surface 274 such that outer portion 72 and inner portion 70 are integrally formed. First axial end 290 of outer portion 72 may be radially offset from outer surface 274 of inner portion 70 so as to form an inlet 300 of outer fluid passage 262. Inlet 300 may be an annular inlet and concentric with inlet 310. Second axial end 292 may be radially offset from outer surface 274 of inner portion 70, and may be coupled to outer surface 274 by a base wall 314. A diameter D3 of first axial end 290 of outer portion 72 may be the same or similar to a diameter D4 of second axial end 292 of outer portion 72, such that a sidewall 278 of outer portion 72 is parallel to inner portion 70.

In various embodiments, outer portion 72 may define one or more apertures 264 formed through sidewall 278 of outer portion 72. One or more apertures 264 disposed through sidewall 278 of outer portion 72 extend from inner surface 280 to outer surface 282 of outer portion 72. The apertures 264 may form an outlet 302 of outer fluid passage 262 allowing fluid to exit fitting 250 without mixing with fluid flowing through outlet 312. Apertures 264 may have a trapezoidal shape, a partial annular shape, a circular shape, an oval shape or any suitable shape. Apertures 264 may be separated by a prong 304 of sidewall 278.

In various embodiments, fitting 250 may also be configured to minimize thermal load transfer between inner portion 70 and outer portion 72. Prongs 304 of outer portion 72 may be configured to reduce conductive heat transfer between inner portion 70 and outer portion 72. For example, a width of prongs 304 may be less than a width of apertures 264 in order to minimize the material of outer portion 72. By forming prongs 304 with a relatively thin shape, the heat transfer between inner portion 70 and outer portion 72 may be reduced. The shape and size of apertures 264 may be configured to provide a large cross sectional surface area at outlet 302 of outer fluid passage 362. Apertures 264 may allow fluid to flow through outer fluid passage 262 of fitting 250 with minimal fluid pressure loss.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A monolithic fitting for a double wall tube, comprising:
    an inner portion defining an inner fluid passage and having a distal end and a proximal end defining an inner portion axial distance; and
    an outer portion disposed concentrically around the inner portion and defining an outer fluid passage fluidly isolated from the inner fluid passage between the outer portion and the inner portion, the outer portion having a first axial end and a second axial end, the first axial end having a first axial distance from the proximal end, the second axial end having a second axial distance from the proximal end, wherein the inner portion axial distance is greater than the first axial distance and the second axial distance, wherein the outer portion defines a first aperture disposed through a sidewall of the outer portion, and wherein a first outer diameter of the first axial end is greater than a second outer diameter of the second axial end, and wherein the second axial end of the outer portion is coupled to an outer surface of the inner portion.

2. The monolithic fitting of claim 1, wherein the second axial end of the outer portion is integral with the outer surface of the inner portion.

3. The monolithic fitting of claim 2, wherein the first axial end of the outer portion is offset from the outer surface of the inner portion to form an inlet of the outer fluid passage, and wherein the first aperture forms an outlet of the outer fluid passage.

4. The monolithic fitting of claim 3, wherein the outer portion further defines a second aperture disposed through the sidewall of the outer portion, and wherein a prong of the sidewall is disposed between the first aperture and the second aperture, and wherein the prong of the sidewall is coupled to the first axial end and the second axial end of the outer portion.

5. The monolithic fitting of claim 1, wherein the outer portion comprises a frustoconical portion, and wherein the inner portion comprises a tubular portion.

6. The monolithic fitting of claim 1, wherein the outer fluid passage is concentric with the inner fluid passage and wherein the outer fluid passage is fluidly isolated from the inner fluid passage.

7. A double wall tubing assembly, comprising:
    an outer tube;
    an inner tube disposed within the outer tube; and
    a monolithic fitting coupled to the inner tube and the outer tube, the monolithic fitting comprising:
        an inner portion defining an inner fluid passage and having a distal end and a proximal end defining an inner portion axial distance; and
        an outer portion disposed concentrically around the inner portion and defining an outer fluid passage fluidly isolated from the inner fluid passage between the outer portion and the inner portion, the outer portion having a first axial end and a second axial end, the first axial end having a first axial distance from the proximal end, the second axial end having a second axial distance from the proximal end, wherein the inner portion axial distance is greater than the first axial distance and the second axial distance, wherein the outer portion defines a first aperture disposed through a sidewall of the outer portion, and wherein a first outer diameter of the first axial end being greater than a second outer diameter of the second axial end, and wherein the second axial end of the outer portion is coupled to an outer surface of the inner portion.

8. The double wall tubing assembly of claim 7, wherein the second axial end of the outer portion is integral with the outer surface of the inner portion.

9. The double wall tubing assembly of claim 8, wherein the first axial end of the outer portion is offset from the outer surface of the inner portion to form an inlet of the outer fluid passage, and wherein the first aperture forms an outlet of the outer fluid passage.

10. The double wall tubing assembly of claim 9, wherein the outer portion further defines a second aperture disposed through the sidewall of the outer portion, and wherein a prong of the sidewall is disposed between the first aperture and the second aperture, and wherein the prong of the sidewall is coupled to the first axial end and the second axial end of the outer portion.

11. The double wall tubing assembly of claim 7, wherein the outer portion comprises a frustoconical portion, and wherein the inner portion comprises a tubular portion.

12. The double wall tubing assembly of claim 7, wherein the outer fluid passage is concentric with the inner fluid passage, and wherein the outer fluid passage is fluidly isolated from the inner fluid passage.

13. A double wall tubing assembly, comprising:
    an inner tube defining a first fluid path;
    an outer tube disposed around the inner tube and defining a second fluid path between the outer tube and the inner tube; and
    a monolithic fitting coupled to the inner tube and the outer tube, the monolithic fitting comprising:
        a first inlet in fluid communication with the first fluid path,
        a second inlet in fluid communication with the second fluid path and having an axial fluid direction, wherein the monolithic fitting is configured to fluidly isolate the second fluid path from the first fluid path;
        an outlet in fluid communication with the second fluid path, the outlet defining a radially outward fluid direction for the second fluid path; and
        an inner portion and an outer portion disposed around the inner portion, wherein the first inlet is defined within the inner portion and the second inlet is defined between a first axial end of the outer portion and an outer surface of the inner portion, wherein the outer portion has a second axial end, wherein a first outer diameter of the first axial end is greater than a second outer diameter of the second axial end, and wherein the second axial end of the outer portion is coupled to the outer surface of the inner portion.

14. The double wall tubing assembly of claim 13, wherein the second fluid path is concentric with the first fluid path, and wherein the second inlet is concentric with the first inlet.

15. The double wall tubing assembly of claim 13, wherein the monolithic fitting defines a plurality of apertures disposed through a sidewall of the monolithic fitting, and wherein the apertures form the outlet for the second fluid path.

16. The double wall tubing assembly of claim 13, further comprising a seal disposed at the outlet of the monolithic fitting and disposed between the first fluid path and the second fluid path.

\* \* \* \* \*